US011997775B2

(12) United States Patent
Secretin

(10) Patent No.: US 11,997,775 B2
(45) Date of Patent: May 28, 2024

(54) COMMUNICATION DEVICE

(71) Applicant: Schreder S.A., Brussels (BE)

(72) Inventor: Laurent Secretin, Remicourt (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/629,145

(22) PCT Filed: Jul. 23, 2020

(86) PCT No.: PCT/EP2020/070801
§ 371 (c)(1),
(2) Date: Jan. 21, 2022

(87) PCT Pub. No.: WO2021/013925
PCT Pub. Date: Jan. 28, 2021

(65) Prior Publication Data
US 2022/0272821 A1 Aug. 25, 2022

(30) Foreign Application Priority Data
Jul. 23, 2019 (NL) ...................................... 2023556

(51) Int. Cl.
*H05B 47/175* (2020.01)
*H05B 47/26* (2020.01)

(52) U.S. Cl.
CPC ........... *H05B 47/175* (2020.01); *H05B 47/26* (2020.01)

(58) Field of Classification Search
CPC ....... H05B 47/175; H05B 47/26; H05B 47/19
See application file for complete search history.

(56) References Cited

U.S. PATENT DOCUMENTS

2012/0038281 A1 2/2012 Verfuerth
2012/0080944 A1* 4/2012 Recker .................. H05B 47/16 307/25
2015/0091451 A1 4/2015 Williams
2018/0096572 A1* 4/2018 Jenkins .................. F21V 23/04

OTHER PUBLICATIONS

PCT International Search Report and Written Opinion, Application No. PCT/EP2020/070801, dated Sep. 24, 2020, 10 pages.

* cited by examiner

*Primary Examiner* — Daniel D Chang
(74) *Attorney, Agent, or Firm* — McDonnell Boehnen Hulbert & Berghoff LLP

(57) ABSTRACT

Example embodiments relate to a communication device. One example communication device includes a communication module, an energy storage module, a power cutoff detection module, a processor, and a memory. The communication device is adapted to connect to a power grid for receiving power. The processor is adapted to operate the communication device in a normal mode when connected to the power grid. The power cutoff detection module is adapted to signal to the processor a cutoff from the power grid. The processor is adapted to operate the communication device in power cutoff mode using energy in the energy storage module after receipt of the signal of the power cutoff detection module. The processor is adapted, in power cutoff mode, to determine an amount of energy in the energy storage module and to store a value indicative of the amount in the memory.

20 Claims, 3 Drawing Sheets

COMMUNICATION DEVICE

CROSS-REFERENCE TO RELATED APPLICATIONS

The present application is a national stage entry of PCT/EP2020/070801 filed Jul. 23, 2020, which claims priority to NL 2023556 filed Jul. 23, 2019, the contents of each of which are hereby incorporated by reference.

TECHNICAL FIELD

The present invention relates to a communication device. In particular, the invention relates to a communication device to be combined with an external device to connect the external device to a network. An aspect of the invention relates to a device for performing an action. More in particular, the invention relates to a communication device to be combined with a luminaire, preferably an outdoor luminaire, to establish a luminaire network, preferably an outdoor luminaire network, to control the lighting.

BACKGROUND

In luminaire networks, preferably outdoor luminaire networks, each luminaire may be provided with a device, preferably a communication device, to connect the luminaire to a network. Via the communication device, the luminaire can be controlled. The communication devices, preferably all of them, may comprise a short-range communication module to communicate in the local network. Part of the communication devices may additionally comprise a long-distance communication module to communicate with a remote server. Alternatively, all communication devices may comprise a long-distance communication module to communicate with a remote server so that it may be unnecessary to also provide the communication devices with a short-range communication module. Further alternatively, all communication devices may comprise a long-distance communication module to communicate with a remote server and a short-range communication module.

Via the network, luminaires in the lighting system can be controlled by a central management system. The central management system allows an operator to set static and/or dynamic controls for the luminaires. Static controls define a behavior of the luminaire over time. Dynamic controls define the output of the luminaire in relation to obtained data and/or time. Obtained data is defined as at least one of received data, measured data, sensor data and pre-programmed data. In any case, independent of the configuration, it is considered to be an advantage when the operator can retrieve the actual status of each luminaire at each moment in time.

Tests have shown that when devices in the network loose connection, for example due to technical issues or power source, grid or battery, being cut off, the status of the luminaire is not updated at the remote management server and the operator cannot retrieve the most recent status of the luminaire. This becomes more problematic when the network has not yet detected that communication is lost. In the latter situation, the central management system indicates the previous status of the luminaire as the current status, which is incorrect in most situations. In another situation, the device for performing an action is unable to properly end an action, for example store a last sensor value in a memory, after unexpected loss of power.

Although embodiments of the invention are conceived in relation to the luminaire networks, the underlying problem and corresponding solution are also relevant for networks other than luminaire networks. In general, internet-of-things (IoT) networks provide a communication mechanism for smart devices allowing these devices to be controlled by and/or provide information to other devices, remote servers, operators and/or users. In such context, it is a benefit when the most recent status stored at the server is reliable.

It is an object of the invention to increase the reliability of the information in the remote server.

SUMMARY

To this end, the invention provides a communication device comprising a communication module, an energy storage module, a power cutoff detection module, a processor and a memory;

- the communication device being adapted to directly or indirectly connect to a power grid for receiving power;
- the processor being adapted to operate the communication device in a normal mode when connected to the power grid;
- the power cutoff detection module being adapted to signal to the processor a cutoff from the power grid;
- the processor being adapted to operate the communication device in power cutoff mode using energy in the energy storage module after receipt of the signal of the power cutoff detection module; and
- the processor being adapted, in power cutoff mode, to determine an amount of energy in the energy storage module and to store in the memory a value indicative of the amount.

The invention is based on the insight that energy from the energy storage module can be used by the communication device to perform one or more predetermined actions after cutoff from the power grid. Additionally, at least part of the energy from the energy storage module may be used by an external device to perform at least part of a predetermined action. These one or more predetermined actions are defined in the power cutoff mode. After receipt of the signal of the power cutoff detection module, the processor operates the communication device in power cutoff mode. The capability of the energy storage module to store a given amount of energy changes over time. Temperature can influence this amount of energy. Age, due to decay over time, significantly influences the amount of energy that can be stored in the energy storage module. It is an aspect of the invention to determine and/or monitor the amount of energy in the energy storage module, and to store a value indicative of this amount in the memory. This information can be retrieved from the memory and forms the basis for optimization of the one or more predetermined actions. In other words, by storing in the memory the value indicative of the amount of energy, an operator is enabled to optimize the use of the energy after cutoff from the power grid. According to examples of the invention, this optimization could include performing a sensor measurement, and/or transmitting one or more last communication messages thereby increasing the reliability of the information in the remote server. The operator is also enabled to detect an insufficiency or optionally predict a future insufficiency of the amount of energy to send a last message. Sending a last message after cutoff from the power grid updates the status of the communication device at the remote management server. Detecting or predicting such insufficiency allows efficient maintenance and/or replacement, thereby increasing the reliability of the information in the remote management server. This optimization could further include changing communication paths in the network.

Preferably, the processor is adapted to operate the communication device in power cutoff mode by performing a predetermined number of actions as last activity before power down. The predetermined number of actions preferably includes sending a last message to a remote management server. The predetermined number of actions preferably further includes listening for a predetermined time for messages to be re-transmitted. The predetermined number of actions preferably further includes using at least part of the energy in the energy storage device by a device external from the communication device, and the predetermined actions may comprise actions performed by the external device. The predetermined number of actions can be changed by changing the number or amount of actions or can be changed by changing one or multiple of the actions itself (without necessarily changing the amount of actions). The term predetermined is intended to refer to both the number and the action(s) itself, so to a predetermined number of predetermined actions. In other words, a predetermined number of actions refers to a well-selected number of defined actions.

Preferably, the determining of the amount of energy includes at least measuring the energy remaining in the energy storage module after the predetermined number of actions have been performed. Preferably, the value stored in the memory relates to the energy remaining By measuring the energy remaining in the energy storage module after the number of actions have been performed, the energy surplus is determined. This energy surplus will decrease over time, so that the operator can detect when preventive maintenance is required. Alternatively the processor can adapt the predetermined actions accordingly. Also, the energy surplus can be used to perform extra actions which are deemed unnecessary but useful.

Preferably, the communication device comprises a clock and the processor is adapted to determine the amount by counting, via the clock, an operational time of the processor in power cutoff mode. It is noted in this context that the term processor is used primarily to indicate that elements perform the defined function, and is not intended to limit the processing element itself. It is not intended as a limitation as to where the function is performed but only that the function is performed. External processing elements could cooperate with the communication device to perform the function of counting the operational time. This shall be understood as falling within the wording of the communication devices comprising a clock and a processor adapted to determine the amount by counting the operational time. Preferably, the processor is adapted, in power cutoff mode, to periodically store in the memory a value indicative of the time passed. When the processor runs on energy from the energy storage module, the processor will at an unknown moment in time stop working. By periodically storing a value in the memory, upon rebooting the processor, the value stored last before the processor stopped working will provide an indication of the running time of the processor. This running time is proportional to the amount of energy in the energy storage module. Preferably, the processor is adapted, in power cutoff mode, to periodically overwrite said value with a higher value.

Preferably, a further value is stored in the memory indicating the time passed between cutoff from the power grid and finishing performing the predetermined number of actions, the combination of the further value and said value being an indication of the total time of operation of the processor in power cutoff mode.

Preferably, the processor is adapted, after the power grid is reconnected, to read said value from the memory and to change the predetermined number of actions based on said value. Alternatively, the processor is adapted, after the power grid is reconnected, to measure the time necessary to charge the energy storage module as an indication of the amount. Preferably, the processor is adapted, after the power grid is reconnected, to read said value from the memory and to detect a decaying of the energy storage module based on a comparison of said value with previous values. The changing of predetermined number of actions based on said value and the detecting of a decaying of the energy storage module can be embodied directly in the communication device or indirectly via a server. In the latter case, the server reconfigures, when necessary, the communication device and/or notifies an operator of actions to be taken. In other words it is possible that values from the memory are transmitted so that the decision to change the predetermined number of actions is delocalized and not managed directly by the processor.

Preferably, the communication device is adapted to be physically connected to an external device to connect the external device to a network.

The invention further relates to a luminaire assembly comprising a luminaire and a communication device of the invention, wherein the luminaire forms the external device.

The invention further relates to a set of devices adapted to form a local network, the set comprising at least two communication devices according to the invention.

Preferably the set further comprises a remote server. Further preferably the remote server is adapted to receive said value from the communication device, to determine a number of actions based on said value and to transmit a signal to the communication device to change said predetermined number of actions into the determined number of actions.

The invention further relates to a device for performing an action, comprising an action module, an energy storage module, a power cutoff detection module, a processor and a memory;

- the device being adapted to connect to a power grid for receiving power (1);
- the processor being adapted to operate the device in a normal mode (2) when connected to the power grid;
- the power cutoff detection module being adapted to signal to the processor a cutoff (3) from the power grid;
- the processor being adapted to operate the device in power cutoff mode (4) using energy (5) in the energy storage module after receipt of the signal (5) of the power cutoff detection module; and
- the processor being adapted to determine an amount (6) of energy in the energy storage module and to store a value indicative of the amount in the memory by at least one of measuring an operational time in power cutoff mode and measuring a charging time after power cutoff mode.

The invention is further based on the insight that measuring an amount of energy in an energy storage module can be conducted in an easy and cheap manner by measuring time at a moment of operation of the energy storage module. Particularly when backup energy storage modules are limited in size and complexity, and are added to a device with a minimum of extra costs, it would be a burden and disadvantage to implement or add complex battery or alternative energy storage management systems to keep up with the state of the energy storage module. Since every digital system is running a clock, the invention proposes to use this clock and count the operational time in power cutoff or count the charging time after power cutoff. In each of these moments of using the energy storage module, the time is related to the state of the energy storage module. This allows to add energy storage module monitoring without having to add complexity to the device nor to the energy storage module itself.

When the processor measures a charging time after power cutoff mode, the charging time itself forms a value indicative of the amount of energy in the energy storage module. The energy storage module is charges after power cutoff mode, meaning in the time period after powering ON the device. The device is powered ON by connecting to deice to the grid, which will start the normal mode of operation of the processor. In this mode, the charging time of the energy storage module is measured, which provides an indication of the amount of energy in the energy storage module. This value is stored in a memory. In the context of the invention, the feature 'store a value' should not be interpreted limited as in reserving a part of a permanent memory to keep track of this value, but any processing or transmitting this value shall encompass an at least temporal storage, for example in a buffer memory of a transmission module, of the value. This enables the value to be used and to serve a technical purpose in the device.

Preferably the action is related to operation of a lighting network, preferably an indoor or outdoor lighting network. In lighting networks, luminaires and sensors are integrated into a network that is typically physically distributed. To provide every luminaire, controller, communication device and/or sensor with an energy storage module requires the module to be cheap and simple to integrate. This is particularly achieved with the device of the invention.

Preferably the action is selected from:

- communicating in a luminaire network;
- sensing via a sensor to obtain sensor measurement data; and
- reading and storing at least one of luminaire settings, sensor settings and sensor measurement data.

A specific example of an action may consist of performing a last read of information, for example reading the energy consumption from a metering chip, of through a communication with the luminaire using DALi, so that the last data that are transmitted and/or stored in memory corresponds to last status at power off.

The invention is further related to a method for operating a device in a lighting network, the method comprising the steps of:

- connecting the device to a power grid for receiving power (1);
- operating the device in a normal mode (2) when connected to the power grid;
- signaling a cutoff (3) from the power grid;
- operating the device in power cutoff mode (4) using energy (5) in the energy storage module after receipt of the signal (5); and
- determining an amount (6) of energy in an energy storage module and to store a value indicative of the amount in a memory.

Preferably, the method further comprises amending a predetermined number of actions to be executed when operating the device in power cutoff mode based on said value. The effects and advantages of the method are analogue to the ones described above in relation to the device and communication device.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION OF THE FIGURES

Figure 1:
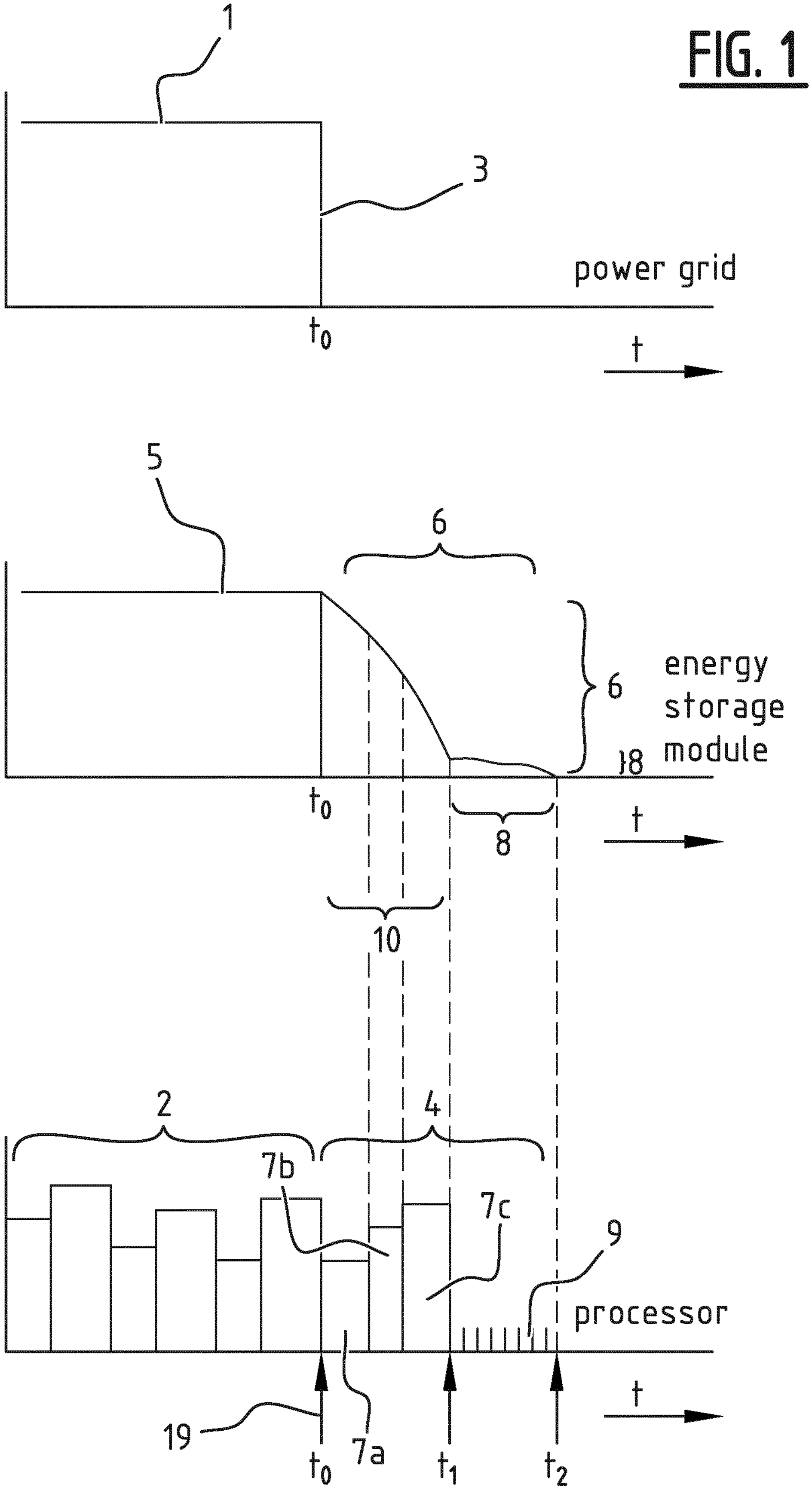
FIG. 1 schematically illustrates the actions and energy flows in the communication device around the moment of power cutoff.

The communication device of the invention is preferably adapted to cooperate with, be connected to, or be integrated in an external device to connect the external device to a network. This enables the external device to share information with, and receive information from the network. Information to be shared with the network for example comprises sensor data and data relating to the status of the device. Information received from the network for example comprises instructions for the external device. These examples illustrate that the external device, because of its connection to the network, can be improved. Operation of the external device can be adapted to environmental and/or external parameters while the network may collect environmental and/or external parameters via the external device. This connecting of external devices to a network is also referred to as the internet of things. The communication device of the invention is preferably an internet of things (IoT) communication device. An IoT communication device enables an external device to be connected to a network.

More preferably, the communication device of the invention is adapted to cooperate with a luminaire to connect the luminaire to a central management system. At the central management system, the operation of multiple luminaires is controlled. Particularly, static and/or dynamic operating instructions are transmitted to the luminaires to control the operation of the luminaires. Dynamic operating instructions may comprise behaviors for the luminaire wherein the operation of the luminaire is defined in function of one or more environmental-related and/or time-related parameters.

The present invention is particularly applicable to devices forming part of a set of devices adapted to form a local network, particularly an outdoor luminaire network. Such set of devices typically comprises at least one first communication device and at least one second communication device, wherein both the first and the second communication devices comprise a short-range communication module to communicate in the local network via a hopping mechanism, and wherein the first communication device additionally comprises a long-distance communication module to communicate with a remote server.

Such set of devices is commonly used to form local communication networks with a mesh topology or a star topology. Such local network is used for example to control an indoor or outdoor lighting system. Via the local network, luminaires in the indoor or outdoor lighting system can be controlled by a central management system. The central management system allows an operator to set static and/or dynamic controls for the luminaires Static controls define a behavior of the luminaire over time. Dynamic controls define the output of the luminaire in relation to obtained data and/or time. Obtained data is defined as at least one of received data, measured data, sensor data and pre-programmed data. In any case, independent of the configuration, it is considered to be an advantage when the operator can retrieve the actual status of each luminaire at each moment in time. The actual status is not necessarily just the on/off info but could also include additional info such as electricity consumption, dimming status at the moment just before the power was cut off, . . . .

Tests have shown that when devices in the local network loose connection, the status of the luminaire is not updated at the remote management server and the operator cannot retrieve the most recent status of the luminaire. This becomes more problematic when the local network has not yet detected that communication is lost. In the latter situation, the local network management system indicates the previous status of the luminaire as the current status, which is incorrect in most situations. A local network is defined as a network extending over a limited physical area, for example a city, a building, a company premise, etc.

In the context of outdoor luminaires, the primary reason for loosing communication with a communication device is power supply cutoff. In a traditional setting, when the power supply is cut off, communication devices loose their functionality and are unable to communicate. By providing a power cutoff detection module and an energy storage module, communication devices are provided with the possibility to continue their operation at least for some period of time. The power cutoff detection module can operate, depending on the type of input power, based on different working principles. When the device is provided with AC power, cutoff can be detected by detecting missing zero-crossings. When the device is provided with DC power, dedicated circuitry can be provided to detect power cutoff. Further mechanisms to detect power supply cutoff are integrated by reference to WO2019175438. The power cutoff detection module may be provided in the communication device or may be formed inside an external device or may be connected as a dedicated module. When the power cutoff detection module is not part of the communication device, it is configured to send a power cutoff signal to the communication device notifying the latter that power has been cut off.

The invention is preferably embodied in a local network with two types of devices. The first type is a device that communicates in the local network and that is also able to communicate with a remote server. To this end, this first type of device is provided with a short-range communication module and a long-distance communication module. Via the short-range communication module, the mesh or star network is locally created. These mesh or star networks use hopping mechanisms to transmit messages through the network. The long-distance communication module additionally enables the device to communicate with a remote server. A second type of devices comprises a short-range communication module. These devices may have another, for example a long-range communication module which may be disabled. Such type of network is further detailed in WO2016075144, WO2016075102, WO2016075107, WO2016075105, WO2016075116, the content of which being included herewith by reference. Alternatively, these devices only comprise a short-range communication module. Such devices are typically cheaper. These devices communicate in the local network with other devices via the short-range communication module. Messages are transmitted to a remote server first via a hopping mechanism, using the short-range communication modules, from the second type of communication devices to a first type of communication device. Secondly, these messages can, upon arrival at the first type of communication device, be forwarded to a remote server. Messages from the server are transmitted to the second type of communication devices the other way around, as will be clear to the skilled person. In other words, the messages from the second type of communication devices are indirectly, particularly via another device of the first type in the local network, transmitted to the remote server.

In the devices of the first type, preferably a first energy storage module is provided to enable these devices to operate in a first power cutoff mode, preferably comprising listen for a predetermined amount of time for messages received from surrounding devices. These messages are typically received from devices of the second type. The devices of the first type transmit these received messages to the remote server. In addition, the devices of the first type may also send their own message regarding e.g. their own status.

The devices of the second type comprise a second energy storage module that is configured to enable the device of the second type to operate in a second power cutoff mode, preferably comprising at least the action of sending a last message in the local network for transmission to the remote server. This set-up has several advantages particularly in the context of luminaire networks. A first advantage is that each device is enabled to send a last message to the remote server after power supply cutoff. A further advantage is that local network efficiency is maintained since the devices of the second type, which are the cheaper devices, can be provided with a cheap power supplying module. Part of the invention is further based on the insight that power supply cut off typically affects multiple communication devices located in a small region at the same time. The invention allows all of these devices to execute actions in the power cutoff mode based on their respective amounts of energy remaining in the energy storage module. Additionally, actions may be further defined based on a hopping distance from the first type of communication device.

Although embodiments of the invention are conceived in relation to the luminaire networks, the underlying problem and corresponding solution are also relevant for other than luminaire networks. In general, internet-of-things (IoT) networks provide a communication mechanism for smart devices allowing these devices to be controlled by and/or provide information to other devices, remote servers, operators and/or users. In such context, it is a benefit when the most recent status stored at the server is reliable.

Figure 2:
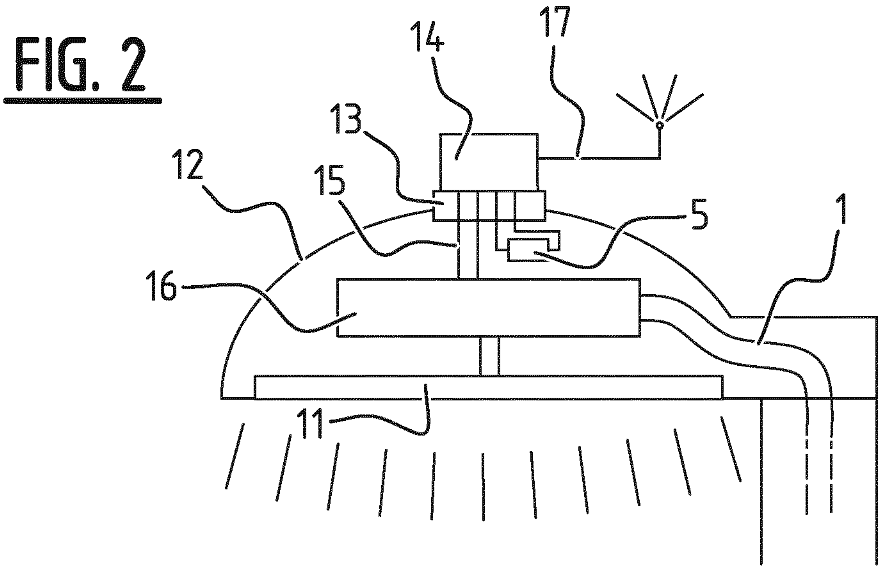
FIG. 2 schematically illustrates a luminaire device with a communication device of an embodiment of the invention.
Figure 3A:
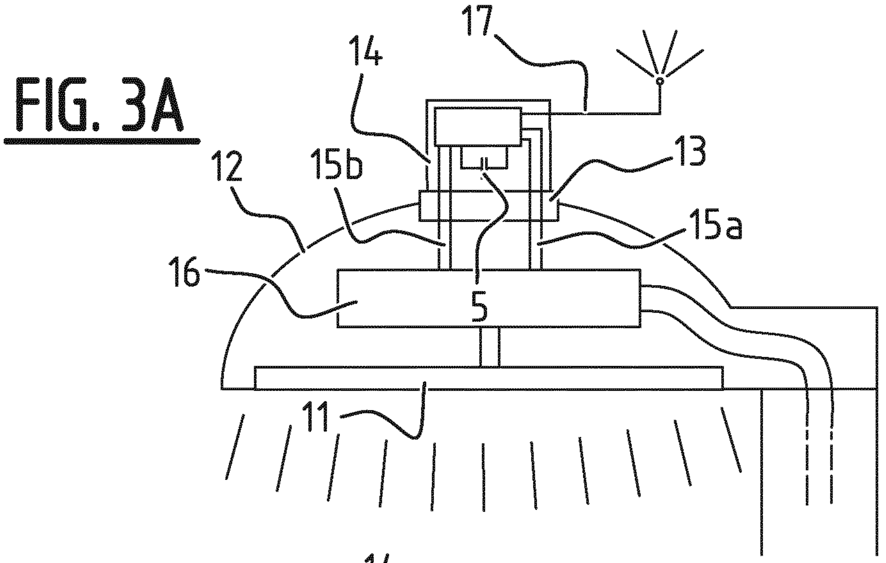
FIGS. 3A and 3B schematically illustrates different examples of luminaire devices with a communication device of an embodiment of the invention.
Figure 3B:
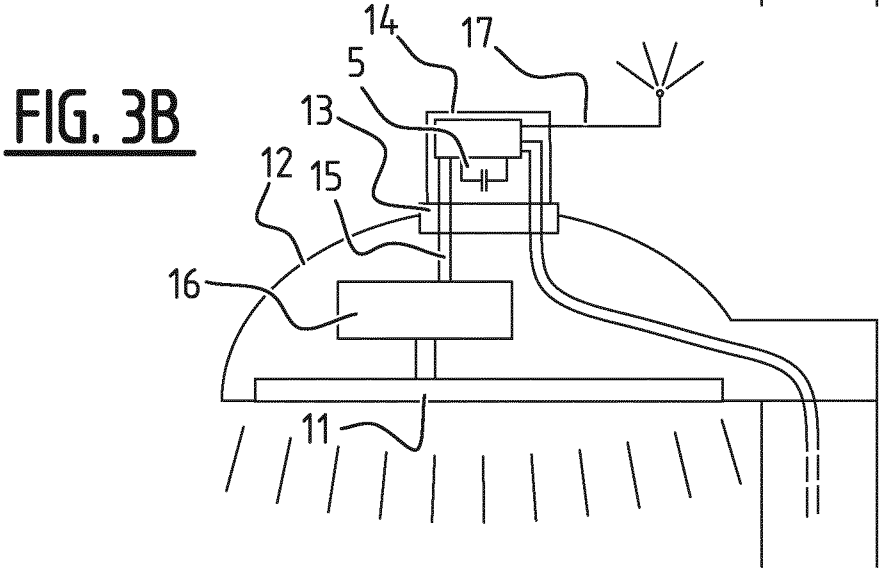

The invention is particularly relevant when the external device is connected to the power grid and provides power to the communication device. Such situation may be embodied in different ways. For example, the communication device can receive power directly from the external device, which power may already be converted. Such example is shown in FIGS. 2 and 3A. Alternatively, the communication device may receive the grid power directly, and transmit power to, or provide power to the external device. Such example is shown in FIG. 3B. The communication device is provided with an energy storage module. The primary function of the energy storage medium is providing energy to the communication device when the power from the grid is cut off. In other words, the energy storage medium is provided to provide backup energy. Using this backup energy, the communication device can at least transmit a communication message to the network that the external device is cutoff from the power grid. In a preferred situation, the backup energy is used to perform a predetermined number of final actions.

FIG. 1 shows three timelines, an upper, a middle and a lower timeline. The upper timeline illustrates the power grid and illustrates that at time t0 the power is cut off. Grid power is illustrated with reference number 1. Reference number 3 illustrates the power cutoff. The middle timeline illustrates the power in the energy storage module. This middle timeline shows that the energy in the energy storage module is fully charged up till the moment t0. This is illustrated with reference number 5. After the moment t0, when the power is cut off, energy is used from the energy storage module to perform one or more final actions. This is illustrated with the decreasing line in the middle timeline after the moment t0. The lower timeline shows the processor activity of the communication device. Before time t0, the processor operates in normal mode 2. After time t0, the processor is operated in power cutoff mode 4.

Before cutoff 3, energy consumption of the communication device is not a major issue. Energy usage can be optimized as a secondary benefit, but engineering and design choices are primarily made to optimize operation. In FIG. 1, normal mode is illustrated by a number of actions that are performed by the processor. These actions in normal mode are shown by blocks in the lower timeline, each block illustrating a different action. Actions comprise any activity of the communication device that is related to communication with the external device or to communication with the network. Examples of actions are: requesting and receiving a status of the external device; requesting and receiving a sensor measurement of a sensor connected to or integrated in the external device; transmitting data to the network; receiving data from the network; forwarding or hopping messages in the network. In this context, it is emphasized that the communication device of embodiments of the invention is usable in a broader context than only luminaires. The communication device may be connected to or interweaved in any external device to enable the external device to be controlled by the communication device and to send and/or receive data from/at the external device to/from a remote server. The communication device of embodiments of the invention is therefore defined as any device, standalone or fully integrated in an external device enabling the external device to be at least partially controlled by the communication device and enabling the external device to at least partially exchange data with a remote server. In particular embodiments, one communication device is provided for several external devices, e.g. a luminaire and a sensor included in the luminaire.

After cutoff 3, the energy available to the communication device is limited, particularly to the energy available in the energy storage module. The available energy is illustrated in FIG. 1 with reference number 6. Reference number 6 indicates both the available time and the available energy, which are related. After cutoff 3, the communication device is operated in a power cutoff mode. In power cutoff mode, engineering and design choices are primarily made to optimize energy usage. In FIG. 1, power cutoff mode is illustrated with reference number 4. In power cutoff mode, a predetermined number of actions, illustrated as actions 7*a*, 7*b* and 7*c*, is performed by the communication device optionally in combination with an external device. These predetermined actions are statically or dynamically determined. When these actions are statically determined, the communication device is pre-programmed to perform a predetermined number of actions after power cutoff 3. When these actions are dynamically determined, the communication device adapts the number of actions based on a number of parameters including the amount 6.

Power cutoff is preferably detected by a power cutoff detection module. The power cutoff detection module can be integrated in the communication device. Alternatively, the power cutoff detection module is operationally connected to the communication device. In any case, the power cutoff detection module signals the communication device that power is cut off 3. This is illustrated in FIG. 1 with time t0. Power cutoff signal is illustrated in FIG. 1 with reference number 19.

The communication device is preferably adapted to store a timestamp in a memory at time t0. This information can be retrieved from the memory when the grid power is restored. Alternatively, this information is transmitted to a server in power cutoff mode 4. In any case, this information is usable by a server or an operator to obtain or calculate the amount of energy in the energy storage module.

In power cutoff mode 4, the communication device performs a number of actions 7*a*, 7*b*, 7*c*. In a first embodiment, these actions are predetermined by an operator and substantially static. In a second embodiment, these actions are determined dynamically based on the amount of energy 6 measured, which is explained in more detail hereunder. The decisions regarding actions to perform can be made by the communication device itself and/or can be made by a server which sends configuration message to the communication device to configure the latter accordingly. The predetermined actions may comprise actions to be performed by the communication device and/or actions to be performed by the external device and/or actions to be performed by a combined operation of the communication device and the external device. An example of an action to be performed by the external device is switching the external device into standby mode. To enable dynamic determination of the actions, preferably the communication device and/or server comprises a list of actions and a corresponding priority. Based on the amount of energy 6 measured, the communication device and/or server may decide, based on the priorities, which actions to execute in power cutoff mode. For example, notifying the remote server of the power cutoff could be an action having high priority while requesting, retrieving and storing a sensor measurement could be an action having medium priority. Transmitting the sensor measurement to the server could be an action having low priority. Preferably, the decisions regarding actions to perform are made by a server which not only monitors each communication device as an individual device, but also considers neighboring communication device to determine an action strategy that is beneficial for a whole group of communication devices. This allows for example to change a communication path in power cutoff mode to optimize and balance the energy usage of the different communication devices depending on the statuses of the different energy storage modules.

When the predetermined number of actions 7*a*, 7*b* and 7*c* have been preformed, a second timestamp t1 is recorded and preferably stored in the memory. The difference between timestamp t0 and t1 is an indication to the operator how long the actions 7*a*, 7*b* and 7*c* take to perform. This information can be used to optimize the actions in power cutoff mode 4. Furthermore, it is preferred to have an indication of the amount of energy left in the energy storage module after the last action has been performed, thus after time t1. This amount of energy left is indicated in FIG. 1 with reference number 8. Again, this amount of energy 8 can be measured by measuring the time the communication device continues operation before it goes down. Energy storage modules used in these devices are typically low-tech and low-power modules. These modules typically do not allow to measure the remaining percentage of energy as high-tech batteries do.

One technique to measure this time is to periodically store a time-related value in the memory. This is illustrated with reference number 9. The last number stored in the memory before the operation goes down is an indication of time t2. Time t2 indicates the moment the communication device goes down, which corresponds to the amount of energy in the energy storage device being insufficient to support operation of the communication device. The difference between time t2 and t1 is an indication of the energy remaining in the energy storage module after the last action has been performed and the predetermined actions have been cleared. When grid power is restored, values can be retrieved from the memory of the communication device and the communication device or the server can determine whether an extra action can be performed using this remaining energy. This allows optimization of the operation of the communication device in power cutoff mode.

Preferably the amount of energy 8 remaining in the energy storage module after the last action has been performed, is monitored over time. This allows to detect a decreasing trend, based on which preventive maintenance can be planned. This also allows to get insights in the operation over time of the different energy storage modules. Combining these insights with other data such as temperature and power cutoff frequency allows to improve future design choices particularly relating to the energy storage module. In this context, a charging time of the energy storage module could optionally also be monitored. The charging time is the time between grid power on and the subsequent grid power cutoff. Should this charging time be insufficient for completely charging the energy storage module, taking the charging time into account provides improved insights in the status of the energy storage module.

Alternatively, instead of measuring the amount of energy 8 in power cutoff mode, the amount of energy 8 may be measured after power cutoff mode by measuring the charging time of the energy storage module. In other words, when grid power is restored, the empty energy storage module is preferably completely charged. The time it takes to charge the energy storage module gives a direct indication of the amount of energy 8 that is available in the energy storage module. A value may be stored periodically in the memory, analogue to the mechanism described above, during charging so that when charging is finished, the final value is directly related to the amount of energy in the energy storage module.

FIG. 2 shows a luminaire device comprising a housing 12. The housing encloses at least one light source 11 and a corresponding driver 16. The driver 16 controls the output of the light source 11. In some embodiments, multiple light sources are provided to be controlled by one or multiple drivers. Sensors can also be added to the luminaire, for example motion sensors, humidity sensors, environmental sensors including pollutant sensors, light sensors, temperature sensors, visibility sensors etc. The sensors can be arranged inside and/or outside the housing 12. An external power supply 1 is typically provided to power the multiple components in the luminaire. In the embodiment of FIG. 2, the external power supply 1 is connected to the driver 16, and the driver 16 distributes the power among the components in the luminaire.

The housing 12 of the luminaire may be provided with a socket 13. This socket can be formed as by any known type of socket. Such socket may provide a mechanism to provide the communication device with a 24V DC signal, as shown in FIG. 3*a*. In other words, the socket may comprise an electrical interface 15 to feed the communication device with a low voltage power supply, typically 24V DC, from the driver. Alternatively, the socket may be connected to the main power supply and be provided to distribute the power to other devices, as shown in FIG. 3*b*. Such socket may be formed as a socket fulfilling the requirements of the ANSI C136.41-2013 standard or the ANSI C136.10-2017 standard. Such socket is provided to receive the 230V AC power signal, and to provide power to the driver of the luminaire. Alternatively, the socket may fulfil the requirements of the Zhaga Interface Specification Standard (Book 18, Edition 1.0, July 2018, see https://www.zhagastandard.org/data/downloadables/1/0/8/1/book_18.pdf). In other words, it is noted that the socket 13 may be in accordance with the NEMA standard (the ANSI C136.10-2017 standard or of the ANSI C136.41-2013 standard), or with the Zhaga standard (see LEX-R in book 18, Edition 1.0, July 2018) or can be formed as any other known type of socket.

A communication device 14 is connected to the luminaire, preferably to the socket 13. In the embodiment of FIG. 2 the communication device comprises the processor, the communication module 17 and is operationally connected to the energy storage module 5. In the embodiment of FIG. 2, the communication device is formed integrally, and interweaved in the luminaire. In particular, the energy storage module is located in the housing of the luminaire, beneath the socket 13 while the processor of the communication device and communication module 17 are located outside the housing, above the socket 13. Because the energy storage module 5 is operationally connected to the communication device, it is considered that the communication device comprises the energy storage module. In this embodiment, the communication device is partly interweaved with the luminaire.

The energy storage module 5 is provided inside the housing 12 of the luminaire. As described above, this facilitates maintenance. When the energy storage module 5 is formed as a battery, it could be necessary to replace the battery periodically, for example once every five years. This is particularly beneficial when the lifetime of the communication device 14 is expected to be higher than the lifetime of the energy storage module. In the embodiment of FIG. 2, a connection 15 is illustrated between the driver 16 and the processor of the communication device 14. Via this connection 15, power is transmitted and communication messages are exchanged between the driver 16 and the processor of the communication device 14. Via an additional connection, the energy storage module 5 is connected to the processor of the communication device 14. The energy storage module 5 may be formed as a battery, for example a Li-Ion, Ni—Cd or any other type of battery. Alternatively, the energy storage module 5 may be formed by a gold cap or an electrolytic cap or by any other known energy storage element.

The energy cutoff detection module (not shown) may be provided in the communication device 14, or may be arranged in the housing 12 of the luminaire as a dedicated module. Further alternative, the energy cutoff detection module may be arranged in the driver 16 or in the socket 13. In the latter case, the energy cutoff detection module signals the processor of the communication device regarding a cutoff from the power grid. Preferably the energy cutoff detection module is provided as part of the communication device 14. This makes the controller 14 independent from the device it is connected to. It may be connected to any driver or any external device. In the embodiment of FIG. 2, the communication device indirectly receives power from the driver. When the energy cutoff detection module is in the communication device, it can only indirectly detect a cutoff from the grid by detecting a power failure of the driver. This is also considered a power cutoff detection module being adapted to signal to the processor a cutoff from the power grid. The latter feature can be embodied directly, measuring grid power cutoff, or indirectly, measuring power failure of a device which is connected to the grid. In other words, referring to FIG. 2, the energy cutoff detection module is most likely located in the driver as the communication device 14 is not directly electrically connected to the power grid in FIG. 2. Alternatively the energy cutoff detection module is located in the socket 13 or in the communication device 14, and is therefore only able to detect the cutoff of the low voltage (24 VDC) resulting from the cut off of the mains. This alternative allows to indirectly detect power cutoff and is acceptable but not as responsive as a direct power cutoff detection.

The skilled person will understand that the embodiment of FIG. 2 is a mere example, and that multiple modifications can be made without affecting the overall operation of the communication device or of the luminaire. For example, the connection 15 could be split in a power connection and a data connection so that the socket 13 would have three pairs of connectors. The transmission of energy and/or signals through the socket 13 can be formed physically, being a wired connection, or optical or electromagnetic, for example via coils. Instead of setting up a direct communication between the driver 16 and the processor of the communication device 14 electronics can be provided in the housing 12 of the luminaire as an intermediate element, to which for example also one or more of the described sensors can be connected.

In luminaire networks, there has been a history of switching off the lights by simply switching off the main power 1. Recent developments have added additional functionalities and possibilities to control the luminaires. Even with advanced control mechanisms it remains common practice to switch off the lights in the morning by switching off 3 the power 1. Because the energy storage module 5 might be provided in the communication device of the luminaire 12 and is configured to provide energy to the processor and the communication module 17, the communication device is able to update its status in the remote server 18 before being switched off. The communication device 14 preferably comprises a mechanism to measure the external power 1 such that it can detect a cutoff 3 of the external power supply 1. Upon detection of the power cutoff 3, the processor of the communication device 14 is configured to send a status update to the remote server via the communication module 17. This allows the remote server to show the most recent events, also when this most recent event is a power cutoff. This makes the information in the remote server more reliable. The situation above relates to expected power cutoff. Embodiments of the invention are also particularly relevant in case of unexpected power failure.

FIG. 3*a* shows an alternative embodiment of a luminaire. The luminaire comprises a housing 12 enclosing a light source 11 and a corresponding driver 16. The luminaire also comprises a socket 13 for mounting a communication device 14. In the embodiment of FIG. 3, the communication device 14 is provided with a communication module 17. In the embodiment of FIG. 3, the energy storage module 8 is provided inside the housing of the communication device 14. Therefore, in this embodiment, the energy storage module 8 is located outside the housing 12 of the luminaire. In this embodiment the energy storage module 8 can only be replaced together with the communication device 14. This is a beneficial situation when the lifetime of the energy storage module is expected to be about the same as the lifetime of the communication device 14. In the embodiment of FIG. 3, a communication connection 15*a* is provided between the processor of the communication device 14 and the driver 16, and a power connection 15*b* is provided between the processor and the driver 16. The operation and advantages of the embodiment of FIG. 3 are analogue to the operation and advantages described in relation to FIG. 1 and FIG. 2. The skilled person will understand, on the basis of the description above, how the luminaire 12 can send a status update after power cutoff. In FIG. 3*a*, the controller typically receives a 24V DC signal from the driver. Control circuitry is provided in the controller 14 to detect power supply cutoff. In the embodiment of FIG. 3*a*, the energy cutoff detection module is most likely located in the driver and the driver will send a power fail message to the communication device 14 using the communication connection 15*a*. Alternatively the energy cutoff detection module is located in the socket 13 or in the communication device 14, and is therefore only able to detect the cutoff of the low voltage (24V) resulting from the cut off of the mains. This alternative allows to indirectly detect power cutoff and is acceptable but not as responsive as a direct power cutoff detection.

FIG. 3*b* is comparable to FIG. 3*a*, but in the embodiment of FIG. 3*b* the main power supply is connected to the processor of the communication device 14, via the socket 13. The power supply cutoff module can be formed inside the communication device and directly detect grid power cutoff. Such power supply cutoff module in FIG. 3*b* can be formed by zero-crossing detectors. When a predetermined number of zero-crossings is missing, power supply cutoff is detected. In FIG. 3*b*, connection 15 is illustrated between the driver 16 and the communication device 14. Via this connection 15, power is transmitted from the communication device 14 to the driver 16 and communication messages are exchanged between the driver 16 and the communication device 14.

Although FIGS. 2 and 3 shows embodiments wherein the communication device 14 is shown as an element which is physically separated from the driver 16 and other elements of the luminaire, it will be clear that embodiments could be conceived wherein the communication device 14 forms part of and/or is integrated in an assembly. This assembly could be formed by a single element or could be distributed amongst a set of element together constituting the assembly. Such assembly could for example form a luminaire. It will therefore be clear that the features of the communication device of the claims should not necessarily all be physically present in the element 14, but should at least operationally be interconnected to enable the functionality of the communication device to be embodied in the assembly.

The communication device may be configured to send the "last" message multiple times, for example, it may be configured to resend the "last" message as long as receiving communication device has not sent an acknowledgement message, and as long as the energy storage module does not run out of energy. Therefore in the context of this description, the term 'last message' is defined as one or multiple messages that a device may send after power has been cut off and before the device runs out of backup energy. The last message therefore includes the power cutoff message signaling that power has been cut off, and may additionally include further messages and/or additional information in the message. The receiving communication device may be configured to send an acknowledgement message to the communication device upon receipt of the "last" message. Communication devices may transmit the acknowledgement messages, sent by the receiving communication device, using the hopping mechanism. The communication devices may be configured to send their last message several times until it receives acknowledgement from the receiving communication device and/or from the server.

Using the amount of energy in the energy storage module as a parameter to control actions in power cutoff mode has led to further insights that for example sensing actions may be periodically conducted wherein the period, frequency or alternating order of sensing actions amongst multiple communication devices in the network is based on the amount of energy in the energy storage module.

Preferably, said memory is adapted to store, for different amounts of energy in the energy storage module, corresponding different parameters for said actions. Alternatively, actions are predefined or programmed in the communication device with conditions or conditional parameters and the memory merely stores a numeric amount of energy in the energy storage module. In each case, based on the data in the memory, actions are executed differently or different actions are executed for communication devices with different amounts of energy in the energy storage module.

Preferably, said actions comprise a sequence of:

receiving a message from a downstream communication device for transmission to the receiving communication device; and transmitting the received message upstream.

Preferably, the step of transmitting is delayed based on said amount of energy in the energy storage module. More preferably, the smaller the amount of energy in the energy storage module the longer the transmitting is delayed. The delaying of transmitting enables to collect messages from multiple downstream communication devices and transmitting a bundle of messages upstream. This reduces energy required for the transmission of messages and also reduces collision of messages in the network. Preferably, different parameters comprise at least a delay time for delaying the step of transmitting.

Preferably, said actions further comprise sending a message indicative for the power cutoff. Further preferably, the sending a message indicative for the power cutoff and the transmitting of the received message is combined.

Hopping distance is defined as an integral number of re-transmissions required for a message from a sender to reach a predetermined receiver. This means that if a sender can directly transmit a message to the predetermined receiver, the hopping distance is zero 0. Also, if one intermediate device re-transmits a message from a sender to enable the message to be received by the predetermined receiver, the hopping distance is 1.

Figure 4A:
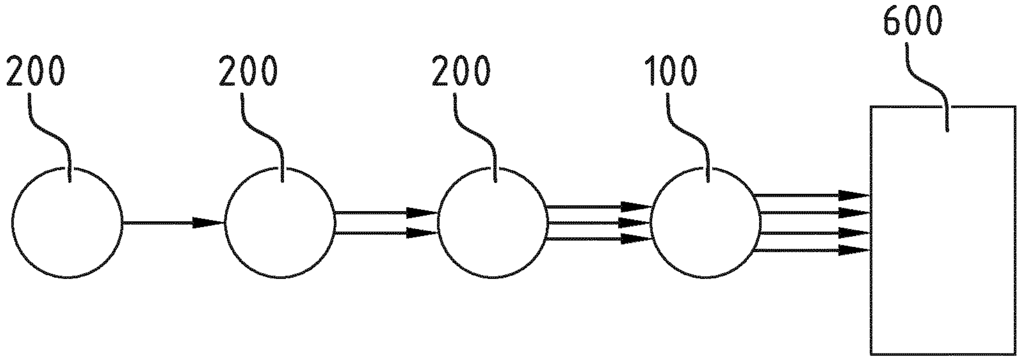
FIG. 4 schematically illustrates an embodiment wherein the actions are changed based on the amount.

The operation of the communication devices is based on the amount of energy in the energy storage module and preferably also on the hopping distance, which is described above. FIG. 4*a* illustrates a drawback when all communication devices operate in the same way in the network. FIG. 4*a* illustrates a communication path between a communication device 200F and the remote server 600. The communication device 200F communicates to the server 600 via the communication device 100 and further via the communication device 200D and the communication device 200E. The hopping distance between the communication device 200F and the communication device 100 is two, namely a data package is transmitted two times being by the device 200E and the device 200D before it reaches the communication device 100. In an analogue way, FIG. 4*a* illustrates the communication path between the communication device 200E and the communication device 100. The hopping distance for device 200E is 1. In an analogue way, FIG. 4*a* illustrates the communication path between the communication device 200D and the communication device 100. The hopping distance for device 200E to the communication device 100 is 0 because there is a direct communication between the device 200E and the communication device 100. The communication device 100 re-transmits all messages to the server 600. The communication device 100 may group multiple message for re-transmission to the server 600, or may re-transmit the messages individually.

FIG. 4*a* illustrates the communication messages that can reasonably be expected between communication device 200F and the remote server 600 in case of a power cutoff when actions of the devices are not based on an amount of energy in the energy storage module nor on a hopping distance. Communication device 200F will transmit a 'last message'. To distinguish between 'last messages' of different devices, this last message will be 'last message 200F'. Communication device 200E also transmits a 'last message' being 'last message 200E'. However, communication device 200E also receives 'last message 200F' for transmission. Therefore communication device 200E sends two messages. Communication device 200D will also transmit a 'last message' being 'last message 200D'. Analogue to communication device 200E, communication device 200D receives 'last message 200E' and 'last message 200F', which are both transmitted such that communication device 200D sends three messages. Communication device 100 receives all messages for transmission to the server 600, and transmits its own 'last message'. This makes clear that even in a short segment of a hopping network, a multitude of messages is generated and transmitted in case of a power cutoff. In the specific example of FIG. 4*a,* 10 messages or data packets are transmitted and re-transmitted substantially at the same time or at least in a short period of time. This not only affects the number of messages to be transmitted in a short period of time, but also affects the amount of energy used by each communication device to send and transmit these messages.

Figure 4B:
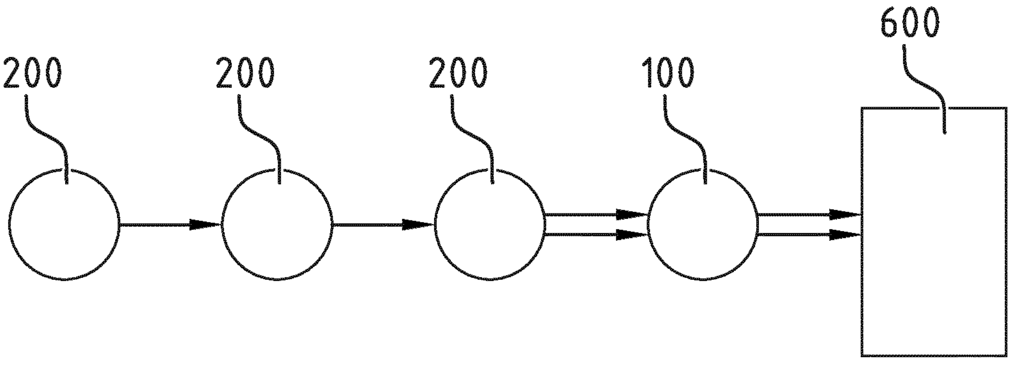

FIG. 4*b* illustrates a communication path between a communication device 200F and the remote server 600 which is the same as FIG. 4*a*. In FIG. 4*b*, the operation of the communication devices is based on the hopping distance. This allows to control actions executed in the communication devices based on the hopping distance. In the example of FIG. 4*b*, the communication devices with an uneven hopping distance, being the device 200E, as well as the communication device 100, are configured to listen for a predetermined time for received messages and, in a further step, configured to combine the messages received during listening with their own last message. As a result, communication device 200E receives a 'last message 200F' and combines its own 'last message 200E' with the received 'last message 200F' into a single message which is transmitted to second communication device 200D. Communication device 200D sends its 'last message 200D' to the communication device 100. Furthermore, its transmits the combined 'last message 200E and 200F' to the communication device 100 such that the communication device 200D sends two messages to the communication device 100. The communication device 100 receives the 'last message 200D' from the communication device 200D. The communication device 100 combines this 'last message 200D' with its own last message into a combined single message to the server 600. Furthermore, its transmits the combined 'last message 200E and 200F' received from the communication device 200D to the server 600 such that the communication device 100 sends two messages to the server 600. In comparison with FIG. 4*a*, it is evident that significantly less messages are transmitted. Alternatively, the communication device 100 combines messages 200D+200E+200F in a first message to the server 600, and transmits its own message separately. Because significantly less messages are transmitted, the amount of energy consumed from the energy storage module for transmitting the messages is also less.

Based on the illustration in FIGS. 4*a* and 4*b*, the skilled person realizes that increasing the listening time of a communication device allows that communication device to send and transmit a lower number of messages. This insight may be used to adapt the listening time further based on an amount of energy in the energy storage module. In particular, when an amount of energy in the energy storage module is below a predetermined threshold, the listening time of that communication device might be increased to decrease the number of messages transmitted by that communication device. In this way, an optimal balance may be obtained between on the one hand the number of messages transmitted when a power cutoff situation occurs and on the other hand the amount of energy available in the energy storage module. Multiple solutions may be proposed wherein the sending and transmitting of messages is based on the amount of energy in the energy storage module and preferably also on the hopping distance.

Further mechanisms can be provided to optimize the operation of the communication device and the network formed by multiple communication devices. For example, one action might be defined as listening for messages, and, while listening for messages, a further action might be defined as storing in a buffer at the respective communication device of the received messages. Furthermore, a selection can be made by the receiving communication device to only store those messages which are intended to be transmitted by the communication device. This avoids unnecessary storage of data. In the communication device, the buffer usage can be monitored and, when the buffer usage is above a predetermined threshold, a combined message is transmitted even when the listening period has not been completed or finished. This avoids that messages become too big. This also avoids that messages are dropped because of lack of buffer space.

The actions to be executed by the communication devices in power cutoff mode may be made dependent on the amount of energy in the energy storage module in many different ways. For example the listening time of the communication devices with a higher amount of energy in the energy storage module may be different from the listening time of the communication devices with a lower amount of energy in the energy storage module. In another embodiment, the listening time of the communication devices can be additionally made proportional to the hopping distance. The proportional listening may be implemented in a static or dynamic manner. When the action of listening is implemented in all devices in the same way, wherein the listening time is encoded as a formula or algorithm wherein the amount of energy in the energy storage module is a factor and wherein preferably the hopping distance is a factor, the listening action is dynamically made proportional to the amount of energy in the energy storage module and the hopping distance respectively. Alternatively, the remote server could, when installing the network, provide instructions to the communication device to listen for a predetermined period of time. This predetermined period of time may be chosen by the remote server based on knowledge of the local network, including knowledge of the amount of energy in the energy storage module and preferably the hopping distance of the particular communication device.

Hopping networks typically comprise a three structure such that the effect of the features above are in practice is significant. It is also noted that listening for messages consumes considerably less energy than transmitting messages. Therefore, from energy management point of view, it is advantageous to configure at least some devices in the network, depending on the amount of energy in the energy storage module and preferably the hopping distance, to listen for messages.

The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A communication device comprising a communication module, an energy storage module, a power cutoff detection module, a processor and a memory;

the communication device being adapted to connect to a power grid for receiving power;

the processor being adapted to operate the communication device in a normal mode when connected to the power grid;

the power cutoff detection module being adapted to signal to the processor a cutoff from the power grid;

the processor being adapted to operate the communication device in power cutoff mode using energy in the energy storage module after receipt of the signal of the power cutoff detection module; and the processor being adapted, in power cutoff mode, to determine an amount of energy in the energy storage module and to store a value indicative of the amount in the memory, wherein the processor is adapted to operate the communication device in power cutoff mode before power down.

2. The communication device according to claim 1, wherein the processor is adapted to operate the communication device in power cutoff mode by performing a predetermined number of actions as last activity before power down.

3. The communication device according to claim 2, wherein the determining of the amount of energy includes at least measuring the energy remaining in the energy storage module after the predetermined number of actions have been performed.

4. The communication device according to claim 3, wherein the value stored in the memory relates to the energy remaining.

5. The communication device according to claim 1, wherein the communication device comprises a clock, and wherein the processor is adapted to determine the amount by counting, via the clock, an operational time of the processor in power cutoff mode.

6. The communication device according to claim 5, wherein the processor is adapted, in power cutoff mode, to periodically store in the memory a value indicative of the time passed.

7. The communication device according to claim 6, wherein the processor is adapted, in power cutoff mode, to periodically overwrite said value with a higher value.

8. The communication device according to claim 6, wherein a further value is stored in the memory indicating the time passed between cutoff from the power grid and finishing performing the predetermined number of actions, the combination of the further value and said value being an indication of the total time of operation of the processor in power cutoff mode.

9. The communication device according to claim 2, wherein the processor is adapted, after the power grid is reconnected, to read said value from the memory and to change the predetermined number of actions based on said value.

10. The communication device according to claim 1, wherein the processor is adapted, after the power grid is reconnected, to read said value from the memory and to detect a decaying of the energy storage module based on a comparison of said value with previous values.

11. The communication device according to claim 1, wherein the communication device is adapted to be physically connected to an external device to connect the external device to a network.

12. A luminaire assembly comprising a luminaire and a communication device according to claim 1, wherein the luminaire forms the external device.

13. A set of devices adapted to form a local network, the set comprising at least two communication devices according to claim 1.

14. The set according to claim 13, wherein the set further comprises a remote server.

15. The set according to claim 14, wherein the remote server is adapted to receive said value from the communication device, to determine a number of actions based on said value, and to transmit a signal to the communication device to change said predetermined number of actions into the determined number of actions.

16. A device for performing an action, comprising an action module, an energy storage module, a power cutoff detection module, a processor and a memory;

the device being adapted to connect to a power grid for receiving power;

the processor being adapted to operate the device in a normal mode when connected to the power grid;

the power cutoff detection module being adapted to signal to the processor a cutoff from the power grid;

the processor being adapted to operate the device in power cutoff mode using energy in the energy storage module after receipt of the signal of the power cutoff detection module; and the processor being adapted to determine an amount of energy in the energy storage module and to store a value indicative of the amount in the memory by measuring an operational time in power cutoff mode or measuring a charging time after power cutoff mode, wherein the processor is adapted to operate the device in power cutoff mode before power down.

17. The device according to claim 16, wherein the action is related to the operation of a lighting network.

18. The device according to claim 17, wherein the action is selected from:

communicating in a luminaire network;

sensing via a sensor to obtain sensor measurement data; and reading and storing luminaire settings, sensor settings, or sensor measurement data.

19. A method for operating a device in a lighting network, the method comprising:

connecting the device to a power grid for receiving power;

operating the device in a normal mode when connected to the power grid;

signaling a cutoff from the power grid;

operating the device in power cutoff mode using energy in the energy storage module after receipt of the signal; and determining an amount of energy in an energy storage module and to store a value indicative of the amount in a memory, after operating the device in power cutoff mode, powering down the device.

20. The method according to claim 19, wherein the step of determining an amount comprises: measuring an operational time in power cutoff mode or measuring a charging time after power cutoff mode.

* * * * *